(12) United States Patent
Ng et al.

(10) Patent No.: US 9,119,376 B2
(45) Date of Patent: Sep. 1, 2015

(54) SYSTEM FOR LOCATING A LOST PET AND METHOD THEREOF

(71) Applicant: SGI Venture Ltd., Hong Kong (HK)

(72) Inventors: Chi Ho Ng, Hong Kong (HK); Wing Haw Ng, Hong Kong (HK); Kin Wang Chau, Hong Kong (HK)

(73) Assignee: SGI VENTURE LTD., Hong Kong (HK)

( * ) Notice: Subject to any disclaimer, the term of this patent is extended or adjusted under 35 U.S.C. 154(b) by 0 days.

(21) Appl. No.: 14/463,664

(22) Filed: Aug. 20, 2014

(65) Prior Publication Data

US 2015/0053760 A1    Feb. 26, 2015

(30) Foreign Application Priority Data

Aug. 21, 2013   (HK) .................................. 13109791

(51) Int. Cl.
*G06K 5/00* (2006.01)
*A01K 15/02* (2006.01)

(52) U.S. Cl.
CPC .................................. *A01K 15/021* (2013.01)

(58) Field of Classification Search
CPC . A01K 11/008; A01K 15/021; A01K 27/009; G08B 1/025; H04M 1/72502; Y10S 119/908
USPC ................................. 235/439, 474; 340/573.3
See application file for complete search history.

(56) References Cited

U.S. PATENT DOCUMENTS

| 6,067,018 A | * | 5/2000 | Skelton et al. ............. 340/573.3 |
| 7,830,852 B2 | * | 11/2010 | Twitchell, Jr. ................ 370/338 |
| 2012/0206296 A1 | * | 8/2012 | Wan ......................... 342/357.31 |
| 2013/0321159 A1 | * | 12/2013 | Schofield et al. .......... 340/573.3 |

FOREIGN PATENT DOCUMENTS

| CN | 102821354 A | 12/2012 |
| CN | 102833674 A | 12/2012 |

OTHER PUBLICATIONS

Search Report of counterpart Hong Kong Short-term Patent Application No. 13109791.7 issued on Sep. 29, 2013.

* cited by examiner

*Primary Examiner* — Seung Lee

(57) ABSTRACT

A system for locating a lost pet includes: a tag configured to be worn on the pet; a handheld device configured to be connected with the tag wirelessly; a remote server configured to store information that corresponds to the pet wearing the tag; and an application installed on the handheld device and configured to provide a user interface and establish a connection with the remote server. The tag includes wireless communication means and a unique identification code for distinguishing the tag among a plurality of tags, and is configured to broadcast the unique identification code wirelessly. The handheld device is configured to establish a connection with the tag within a predetermined range, receive the broadcasted unique identification code from the tag, and trigger a predetermined routine if the connection with the tag is terminated. A method for locating a lost pet is also provided.

17 Claims, 3 Drawing Sheets

SYSTEM FOR LOCATING A LOST PET AND METHOD THEREOF

CROSS REFERENCES TO RELATED APPLICATIONS

This application claims the priority of Hong Kong Short-term Patent Application No. 13109791.7 filed on Aug. 21, 2013, the entire contents of which are incorporated herein by reference.

FIELD OF THE PATENT APPLICATION

The present application relates to a system and method for locating a lost pet. More particularly, the present application relates to a system and method for reporting, identifying, locating a lost pet and informing other users of lost pets using wireless communication devices.

BACKGROUND

A pet is an animal kept for a person's company. Pets form a much closer bond with humans than animals that are kept for various reasons, such as livestock, working animals or sport animals. For the above reason, pets are precious to their owners. Every pet owner would agree that losing their beloved pet is one of the worst things that can happen to them. Aside from deaths due to inevitable aging or deceases, pets running away is another major cause for the owners losing their beloved ones. It became a great concern for the pet owners to prevent the mentioned dreadful situation from happening. Typically, one would think of using a global position system (GPS) device on the pet for tracking of the same. However, GPS modules are generally expensive and power consuming. Such devices cannot stay activated for days or even hours after the pet ran away. Moreover, in the real life situation that a pet is lost, there is very limited man power which may participate in recovering the lost pet. In order to prevent pets from running away and assist in retrieving lost pets, a pet locating system and method which can be reliably and efficiently engaged are desired by every pet owner.

SUMMARY

The present patent application is directed to a system for locating a lost pet. In one aspect, the system includes: a tag configured to be worn on the pet; a handheld device configured to be connected with the tag wirelessly; a remote server configured to store information that corresponds to the pet wearing the tag; and an application installed on the handheld device and configured to provide a user interface and establish a connection with the remote server. The tag includes wireless communication means and a unique identification code for distinguishing the tag among a plurality of tags, and is configured to broadcast the unique identification code wirelessly. The handheld device is configured to establish a connection with the tag within a predetermined range, receive the broadcasted unique identification code from the tag, and trigger a predetermined routine if the connection with the tag is terminated.

The wireless communication means may be compliant to Bluetooth Low Energy protocol. The tag may be a self-contained and battery powered device. The predetermined routine may include a step of sending the unique identification code to the remote server. The tag may further include a light that is configured to be activated wirelessly. The handheld device may be configured to send GPS coordinates of its current location to the remote server.

The handheld device may be configured to periodically send GPS coordinates thereof to the remote server at a preset time interval so that the current location of the handheld device is updated on the remote server. The system for locating a lost pet may further include other tags being worn by other pets. The handheld device may be configured to receive information associated with the other tags in the vicinity of the handheld device based on the current GPS coordinates of the handheld device.

In another aspect, the system for locating a lost pet includes a tag configured to be attached to the pet; a first handheld device configured to be connected with the tag wirelessly; a second handheld device configured to be connected with the tag wirelessly; a remote server configured to store information that corresponds to the pet and to communicate with the first and second handheld devices; and an application installed on the first and second handheld devices and configured to provide a user interface and establish a connection with the remote server. The tag includes wireless communication means and is configured to broadcast a unique identification code through the wireless communication means. The first handheld device is configured to establish a connection with the tag within a predetermined range, receive the broadcasted unique identification code from the tag, and trigger a predetermined routine if the connection with the tag is terminated. The second handheld device is configured to detect the unique identification code, send the unique identification code to the remote server, verify the status of the unique identification code at the remote server, receive information associated with the unique identification code from the remote server, and provide means for contacting an owner of the pet based on the information received from the remote server.

The wireless communication means may be compliant to Bluetooth Low Energy protocol. The tag may be a self-contained and battery powered device. The predetermined routine may include a step of sending the unique identification code to the remote server. The tag may further include a light that is configured to be activated wirelessly. The first handheld device may be configured to send GPS coordinates of its current location to the remote server. The first handheld device may be configured to periodically send GPS coordinates thereof to the remote server at a preset time interval so that the current location of the handheld device is updated on the remote server.

The second handheld device may be configured to receive information associated with the tag, if the tag is in the vicinity of the second handheld device, based on the current GPS coordinates of the second handheld device. The remote server may be configured to assign the unique identification code a status if the connection between the tag and the first handheld device is terminated and to broadcast a notification regarding the pet. The remote server may be configured to initiate an indication on the second handheld device based on the status of the unique identification code.

In yet another aspect, the present patent application provides a method for locating a lost pet. The method includes: establishing a wireless connection between a first handheld device with a tag attached to the pet; acquiring a unique identification code of the tag and sending the unique identification code by the first handheld device to a remote server; monitoring the connection between the tag and the first handheld device; assigning the unique identification code a status at the remote server if the connection between the tag and the first handheld device is terminated; and broadcasting a notification by the remote server regarding the pet.

The wireless communication means may be compliant to Bluetooth Low Energy protocol. The method may further include: detecting the unique identification code by a second handheld device; sending the unique identification code by the second handheld device to the remote server; verifying the status of the unique identification code at the remote server; receiving information associated with the unique identification code by the second handheld device from the remote server; initiating an indication on the second handheld device based on the status of the unique identification code; and providing means for contacting an owner of the pet based on the information received from the remote server.

The indication may be a pop up message or a ringtone sound. The means for contacting the owner of the pet may include an email message, an instant message, or a telephone call. The method may further include: uploading a set of GPS coordinates of the second handheld device's location to the remote server; sending the set of GPS coordinates to the first handheld device by the remote server; and displaying on the first handheld device a proximate position of the pet based on the set of GPS coordinates.

BRIEF DESCRIPTIONS OF THE DRAWINGS

DETAILED DESCRIPTION

Figure 1:
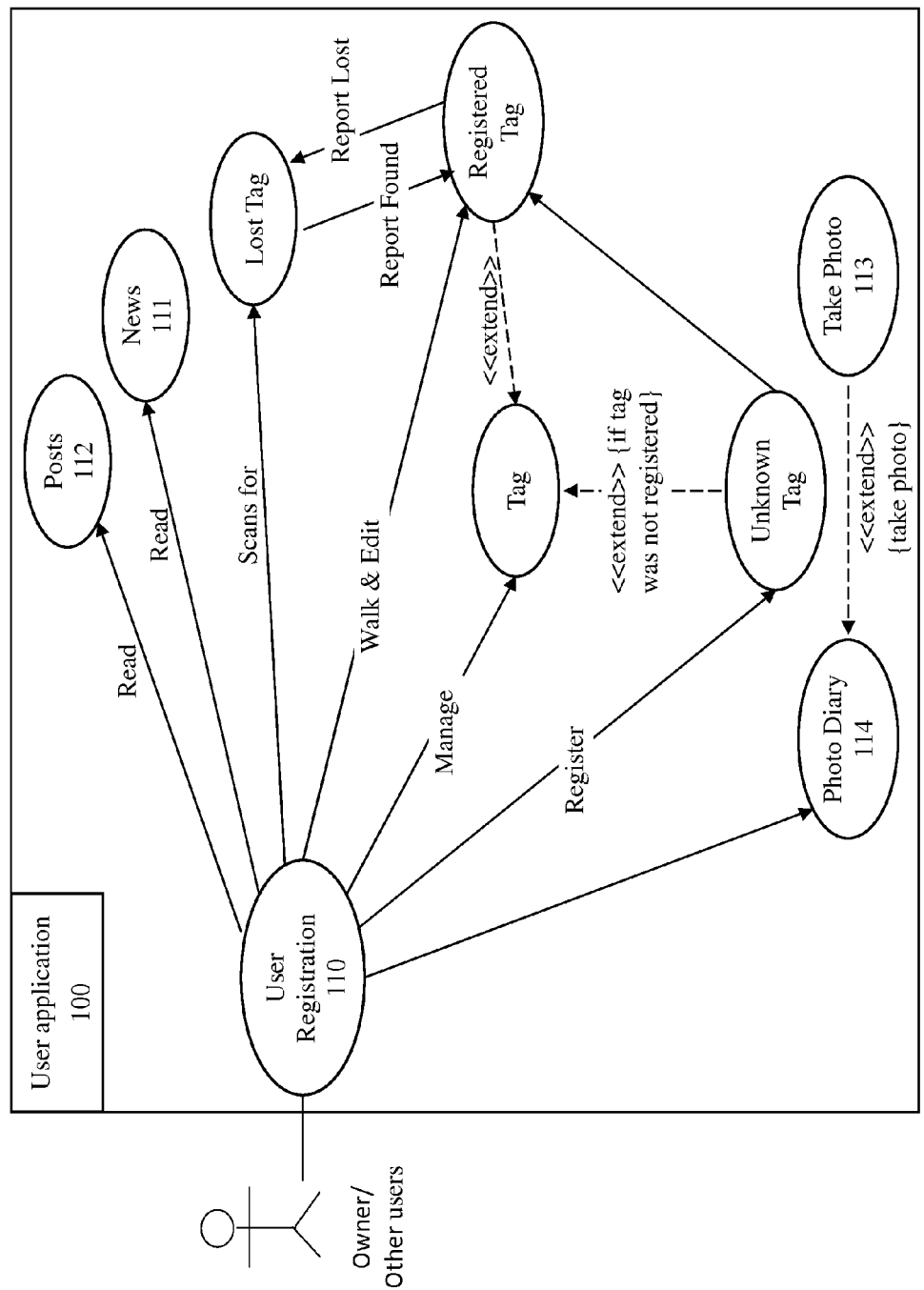
FIG. 1 is a diagram that shows a user application and its general components.

Reference will now be made in detail to a preferred embodiment of the system for locating a lost pet and the method thereof disclosed in the present patent application, examples of which are also provided in the following description. Exemplary embodiments of the system and the method disclosed in the present patent application are described in detail, although it will be apparent to those skilled in the relevant art that some features that are not particularly important to an understanding of the system and the method may not be shown for the sake of clarity.

Furthermore, it should be understood that the system and the method disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

An embodiment of the present application provides a system and method which serve two functions, namely, keeping track of the user's pet and detecting/reporting lost pets.

The system and method for locating a lost pet will be discussed in the following in details. In the present application, the system utilizes both hardware and software components, namely, a tag to be worn on the pet, a client terminal device (hereinafter "handheld device") which may be a smartphone or a tablet computer, a predefined user application and a remote server which is accessible over the Internet. The handheld device is preferably an iOS or Android based device with build-in global position system (GPS) and Bluetooth communication capabilities. Further, the ability of transmitting/receiving mobile data is also preferred. In an embodiment of the present application, Bluetooth enabled handheld device will be used as non-limiting examples.

The tag of the present application is a self-contained radio transmitter including a wireless transmission module and is powered by an onboard battery. The onboard battery may be a button cell. The wireless module preferably utilizes Bluetooth Low Energy (BLE) protocol and is Bluetooth version 4.x compliant. With BLE, the tag is able to stay powered up to 6 months. Each of the tags has a unique digital identification code (also known as "uuid") for distinguishing the tag among other tags in the vicinity. In stand-by mode, the tag continuously emits a signal broadcasting its unique digital identification code to the surroundings. The strength of the signal is configured to cover an area with radius of, for instance, 50 meters. It is appreciated that the range of coverage may be different to suit areas with different population densities.

The tag further includes an indicator light for catching the attention of the passerby in the case that the pet that is wearing the tag is reported lost. The light may be activated by the handheld device, i.e., whenever the connection between the tag and the handheld device is broken. The light alerts the passerby that the pet may be a lost pet. The indicator light also serves as a beacon so that users and passerby can easily spot the lost pet when ambient light and visibility is low.

Typically, the handheld device of the present application is a smartphone or a portable device which the users may find it handy and accessible anytime. For instance, a smartphone is used as a non-limiting example in an embodiment of the present application. In particular, the smartphone is preferably a Bluetooth enabled smartphone and has mobile data communication capability. The Bluetooth module in the smartphone allows detection and reception of the broadcasted uuid from the tag once it is activated.

Further, the present application includes a specifically designed and implemented user application for providing a graphical user interface for easy and intuitive interactions. FIG. 1 shows the general procedures and components of the user registration (110) process when a user accesses the user application 100 on the handheld device for the first time. The user application 100 may be designed such that the account information of users can be retrieved from social media network such as Facebook, Google+, Twitter, Yahoo, etc.

Upon the initial launch of the user application 100, the user is required to enter registration information (110). At the same time, the user is asked to select which social media account for initial registration. After the selection, the user is prompted to provide login information of the selected social media account. Once login has been authenticated, the user will not be asked to provide login information again unless the user deletes the application from the handheld device. In other words, the user is registered with the user application using his unique identification of his selected social media account. Within the user interface of the user application, registered users may access official news 111 released by various pet organizations, read posts about lost pets 112, and take photos 113 of their beloved pets and access photo diary 114. Subsequent to the first successful login, the user application logs in the registered user automatically without the need to re-enter login details.

The embodiment of the present application further includes a remote server for storing the information of the registered users mentioned above and executing various instructions. The remote server may be accessed via the handheld device running the abovementioned user application 100. Data may be uploaded and downloaded between the handheld device and the remote server. Data may include but not limited to registered user's bibliographical details, photographs, messages, real-time GPS coordinates, digital identification code (uuid) of tag, and etc. The remote server is essentially a cloud service provider wherein all user data is stored centrally and can be sent or retrieved individually via data connection established by the handheld device.

Figure 2:
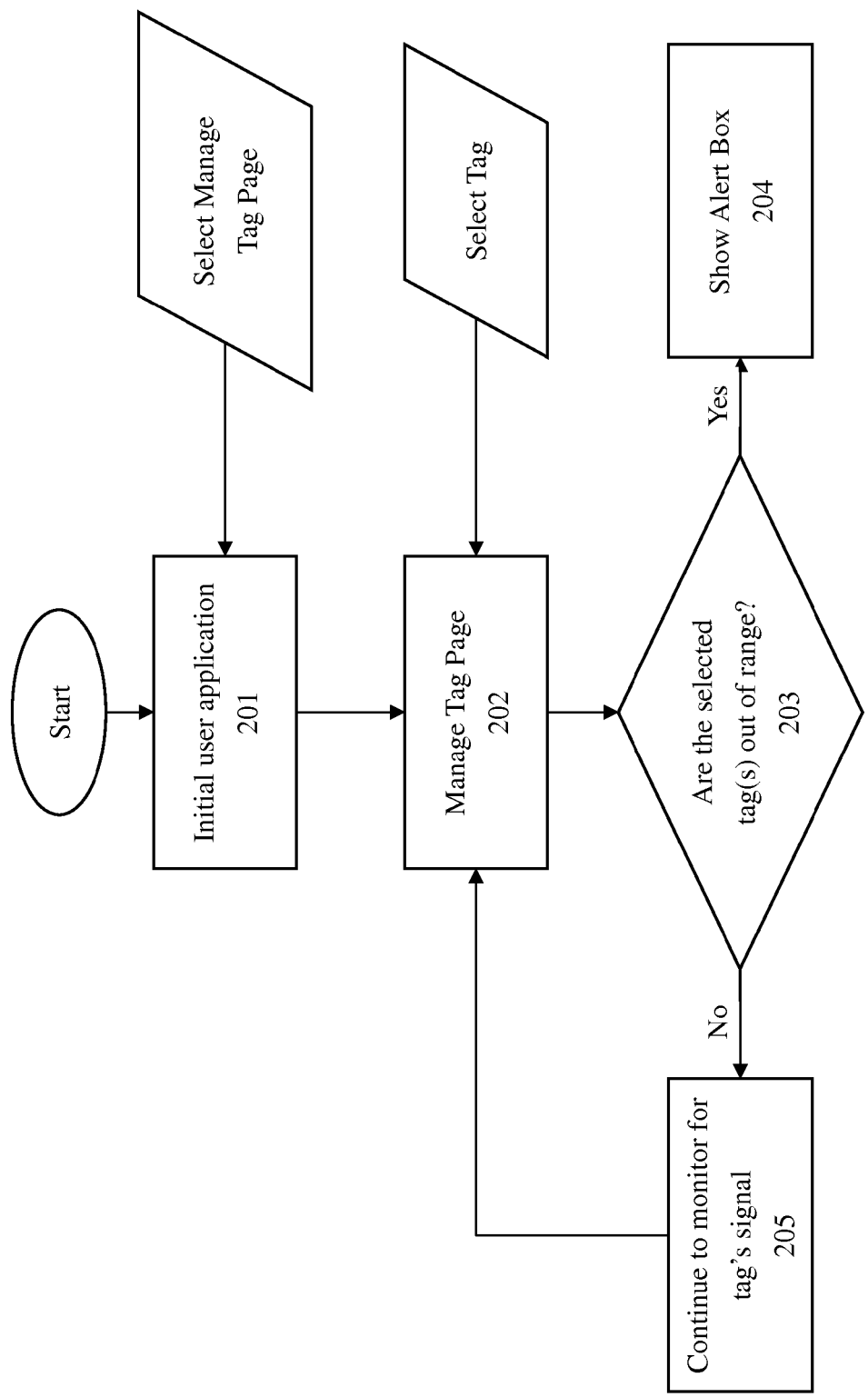
FIG. 2 is a flow chart that illustrates the procedures of monitoring the presence of a pet.
Figure 3:
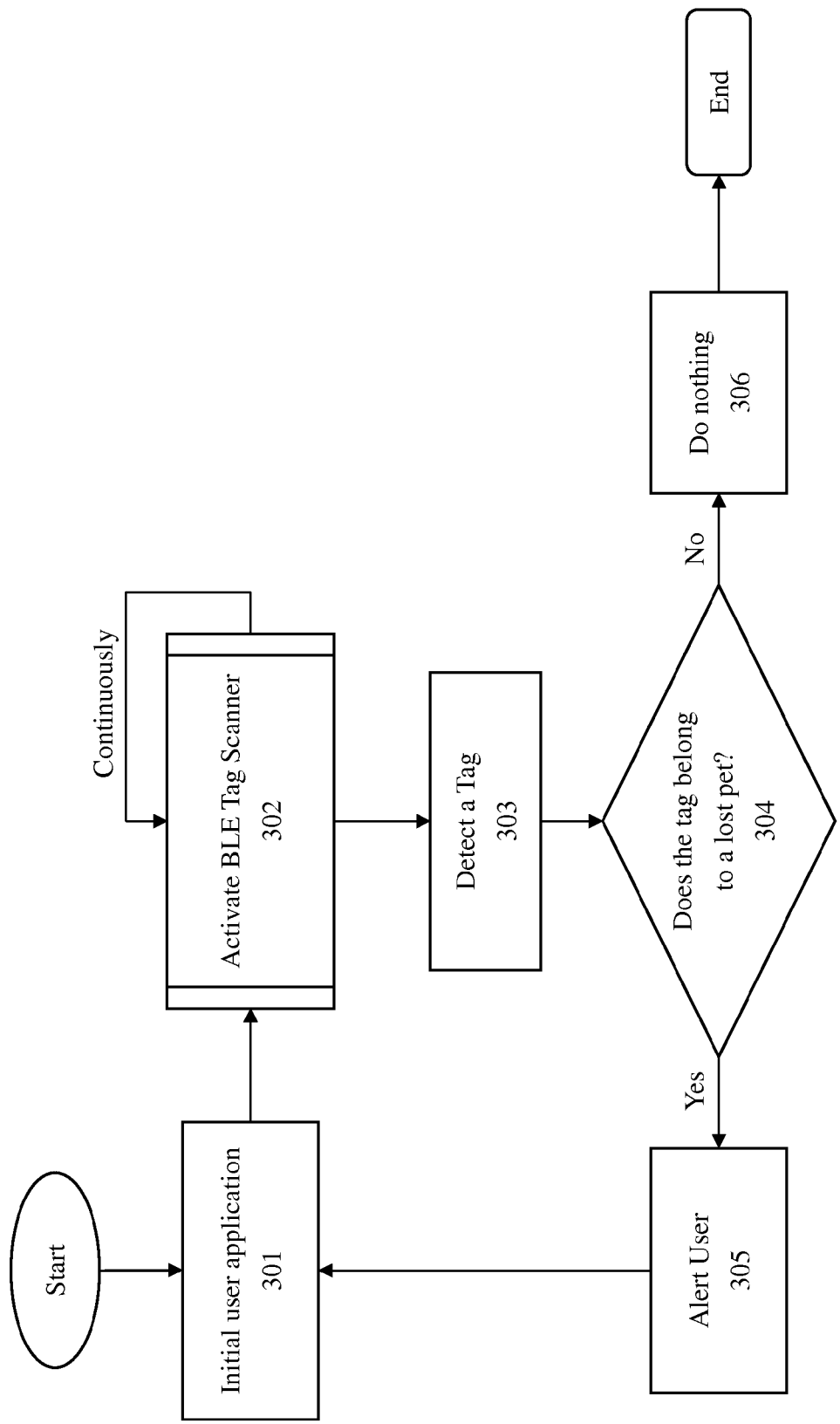
FIG. 3 is a flow chart that illustrates the procedures of discovering a lost pet.

FIGS. 2-3 and the following refer to the general operations of the lost pet locating system in accordance with an embodiment of the present application. The lost pet locating system operates as a pet monitoring system for added security and "peace of mind" to the pet owners. The system generally relies on monitoring a wireless connection between a handheld device and the tag which is wore on the pet. As a non-limiting example in the present application, Bluetooth wireless technology is adopted, while other types of wireless protocol may be used to achieve the same objectives. For instance, the system is used on a dog and his owner while the owner walks his dog without using a leash. The tag may typically be attached to the neck collar of the dog or any place that is easily visible. Once the tag is turned on, the tag broadcasts a wireless signal signifying its unique identification code and is receivable by nearby Bluetooth enabled devices in a given detectable radius, for instance, 50 meters.

The user application installed in the handheld device identifies the identification code by retrieving the related information from the handheld device or from the remote server via Internet connection. In the case that the identified tag matches the digital identification code registered by the owner, the handheld device forms a connection with the tag and instructs the tag to cease broadcasting its digital identification signal so that other nearby Bluetooth enabled devices would not detect the presence of the tag and its identification code. The tag is now in linked mode. Ideally, the user application sends the current GPS coordinates of the handheld device to the remote server and updates its location in a predetermined period of time. The pet owner may now walk his dog and monitor the presence of his dog with the system activated. In the case that the dog goes out of the detectable radius, the connection between the handheld device and the tag will break. When the user application detects that the connection between the tag and the handheld device is dropped, a message displays alerting the user that the dog is not detected in the vicinity. This is illustrated by steps 203 and 204 in FIG. 2. The user application further prompts the user whether he would like to report his pet lost or engage with other options. The user application continues to monitor the signal emitted from the tag until further action is taken by the user. The above is illustrated by step 203 and 205 in FIG. 2.

FIG. 2 further shows the general procedures of the system while the user is walking his pet. In the case that the pet is lost and the user decides to report the loss of his pet, the user application updates the status of the registered tag wore on the lost pet as "lost pet" at the remote server. In another embodiment of the present application, the user application sends additional information i.e., the current GPS coordinates of the handheld device, to the remote server when the pet is reported lost. To facilitate the recovery of the reported lost pet, the user application informs other registered users of the pet locating system that a lost pet is reported. Ideally, the user application selects to inform the registered users only in the vicinity of where the pet was reported lost, based on the current GPS coordinates of the registered users. The means for informing the registered users of nearby lost pets are not limited to pop-up message box, bulletin, ring tone, etc.

FIG. 3 refers to how a lost pet may be discovered by other registered users using their handheld device with the user application installed. For instance, a registered user activates the lost pet locating system in step 301 and walks his pet in the vicinity of a reported lost pet wearing a tag. The above registered user will be designated as the "finder" hereinafter for ease of referencing. In steps 302 and 303, the handheld device of the finder detects the presence, that is, the digital identification code, of the lost pet and sends a query to the remote server to check if the above code corresponds to a reported lost pet, which is step 304. For instance, in the case that the detected identification code belongs to a lost pet, the user application alerts the finder by sounding a ringtone or displaying a pop-up message that a lost pet is detected in the nearby area as shown in step 305. As an example, the displayed message regarding the lost pet may provide the lost pet owner's contact information as well as rewards if anyone assists in recovery of the lost pet. Once the finder is alerted, he would acknowledge that a reported lost pet is present within a radius of 50 meters. The specified range should allow any person with average eyesight to spot the detected lost pet. If the finder has successfully located or acquired the lost pet, he may access the user application and acquires the contact information of the lost pet owner or leave a text message to be sent via the user application. As shown in step 306, if the detected digital identification code does not correspond to a reported lost pet, other routines may be executed by the user application and the same will be discussed in the later part of the description. As another example, any registered user may assist in recovering lost pets by activating the user application on his handheld device whether his pet is present or not.

Further, a build-in LED indicator light may be provided on the tag and programmed to flash when connections with the handheld device is disconnected. The same makes it easier to spot the pet and also catches the attention of passerby. Hence, the above mitigates the chance of losing the pet.

Provided that a mass quantity of registered users have their handheld devices installed with the user application and activated, there is a better chance for lost pets to be detected and recovered. Based on the above, a powerful lost pet detection network is formed thus making locating lost pets possible and efficient.

In addition, a registered user may also identify other registered users or registered tags in the vicinity by accessing a specific routine of the user application. Upon a predetermined action is input on the handheld device by the registered user, the user application retrieves information of all nearby registered users who has their handheld devices and user application activated. This is achieved by sending the current GPS coordinates of the handheld device to the remote server and querying all other registered users with nearby GPS coordinates. At the same time, the handheld device also detects the digital identification code emitted by nearby tags (if any) and relays these codes to the remote server for retrieving their registered details. A list of nearby registered users/pets will be displayed on the user application for the user to interact with.

Various activities may be initiated by the registered user and are not limited to, retrieving pet/owner information, viewing profile pictures, as well as sending text messages or connecting with other registered users as friends. Based on the foregoing, social networking of pet owners and their pets is realized in an intuitive and entertaining means.

A skilled in the art may appreciate that various modifications and additions can be made to the exemplary embodiments discussed without departing from the scope of the present invention. For example, if the handheld device is not connected to the Internet, a pre-downloaded package file with lists of registered user's information may be used. While the embodiments described above refer to particular features, the scope of this invention also includes embodiments having different combinations of features and embodiments that do not include all of the above described features.

While the present patent application has been shown and described with particular references to a number of embodiments thereof, it should be noted that various other changes or modifications may be made without departing from the scope of the present invention.

What is claimed is:

1. A system for locating a lost pet comprising:
   a tag configured to be worn on the pet;
   a handheld device configured to be connected with the tag wirelessly;
   a remote server configured to store information that corresponds to the pet wearing the tag; and
   an application installed on the handheld device and configured to provide a user interface and establish a connection with the remote server; wherein:
   the tag comprises wireless communication means and a unique identification code for distinguishing the tag among a plurality of tags, and is configured to broadcast the unique identification code wirelessly; and
   the handheld device is configured to establish a connection with the tag within a predetermined range, receive the broadcasted unique identification code from the tag, and trigger a predetermined routine if the connection with the tag is terminated;
   wherein the wireless communication means is compliant to Bluetooth Low Energy protocol;
   the tag is a self-contained and battery powered device; the predetermined routine comprises a step of sending the unique identification code to the remote server; the tag further comprises a light that is configured to be activated wirelessly; or the handheld device is configured to send GPS coordinates of its current location to the remote server; and
   the system further comprises other tags being worn by other pets, wherein the handheld device is configured to receive information associated with the other tags in the vicinity of the handheld device based on the current GPS coordinates of the handheld device.

2. The system for locating a lost pet of claim 1, wherein the handheld device is configured to periodically send GPS coordinates thereof to the remote server at a preset time interval so that the current location of the handheld device is updated on the remote server.

3. A method for locating a lost pet, the method comprising:
   establishing a wireless connection between a first handheld device with a tag attached to the pet;
   acquiring a unique identification code of the tag and sending the unique identification code by the first handheld device to a remote server;
   monitoring the connection between the tag and the first handheld device;
   assigning the unique identification code a status at the remote server if the connection between the tag and the first handheld device is terminated;
   broadcasting a notification by the remote server regarding the pet;
   detecting the unique identification code by a second handheld device;
   sending the unique identification code by the second handheld device to the remote server;
   verifying the status of the unique identification code at the remote server;
   receiving information associated with the unique identification code by the second handheld device from the remote server;
   initiating an indication on the second handheld device based on the status of the unique identification code; and
   providing means for contacting an owner of the pet based on the information received from the remote server.

4. The method for locating a lost pet of claim 3, wherein the wireless communication means is compliant to Bluetooth Low Energy protocol.

5. The method for locating a lost pet of claim 3, wherein the indication is a pop up message or a ringtone sound.

6. The method for locating a lost pet of claim 3, wherein the means for contacting the owner of the pet comprises an email message, an instant message, or a telephone call.

7. The method for locating a lost pet of claim 3 further comprising:
   uploading a set of GPS coordinates of the second handheld device's location to the remote server;
   sending the set of GPS coordinates to the first handheld device by the remote server; and
   displaying on the first handheld device a proximate position of the pet based on the set of GPS coordinates.

8. A system for locating a lost pet comprising:
   a tag configured to be attached to the pet;
   a first handheld device configured to be connected with the tag wirelessly;
   a second handheld device configured to be connected with the tag wirelessly;
   a remote server configured to store information that corresponds to the pet and to communicate with the first and second handheld devices; and
   an application installed on the first and second handheld devices and configured to provide a user interface and establish a connection with the remote server; wherein:
   the tag comprises wireless communication means and is configured to broadcast a unique identification code through the wireless communication means;
   the first handheld device is configured to establish a connection with the tag within a predetermined range, receive the broadcasted unique identification code from the tag, and trigger a predetermined routine if the connection with the tag is terminated; and
   the second handheld device is configured to detect the unique identification code, send the unique identification code to the remote server, verify the status of the unique identification code at the remote server, receive information associated with the unique identification code from the remote server, and provide means for contacting an owner of the pet based on the information received from the remote server.

9. The system for locating a lost pet of claim 8, wherein the wireless communication means is compliant to Bluetooth Low Energy protocol.

10. The system for locating a lost pet of claim 8, wherein the tag is a self-contained and battery powered device.

11. The system for locating a lost pet of claim 8, wherein the predetermined routine comprises a step of sending the unique identification code to the remote server.

12. The system for locating a lost pet of claim 8, wherein the tag further comprises a light that is configured to be activated wirelessly.

13. The system for locating a lost pet of claim 8, wherein the first handheld device is configured to send GPS coordinates of its current location to the remote server.

14. The system for locating a lost pet of claim 13, wherein the first handheld device is configured to periodically send GPS coordinates thereof to the remote server at a preset time interval so that the current location of the handheld device is updated on the remote server.

15. The system for locating a lost pet of claim 8, wherein the second handheld device is configured to receive information associated with the tag, if the tag is in the vicinity of the second handheld device, based on the current GPS coordinates of the second handheld device.

16. The system for locating a lost pet of claim 8, wherein the remote server is configured to assign the unique identification code a status if the connection between the tag and the first handheld device is terminated and to broadcast a notification regarding the pet.

17. The system for locating a lost pet of claim 16, wherein the remote server is configured to initiate an indication on the second handheld device based on the status of the unique identification code.

* * * * *